(12) United States Patent
Kopp et al.

(10) Patent No.: US 7,153,183 B2
(45) Date of Patent: Dec. 26, 2006

(54) METHOD AND APPARATUS FOR LAPPING GEARS

(75) Inventors: Gary E. Kopp, Shelby Township, MI (US); Richard W. Locker, Lewiston, MI (US); Bogdan F. Muzyk, Garden City, MI (US); Medhat Said, Livonia, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 138 days.

(21) Appl. No.: 10/996,577

(22) Filed: Nov. 23, 2004

(65) Prior Publication Data

US 2006/0111018 A1 May 25, 2006

(51) Int. Cl.
*B24B 1/00* (2006.01)

(52) U.S. Cl. .............................. 451/5; 451/47; 451/253

(58) Field of Classification Search ................ 451/5, 451/47, 218, 219, 246, 253; 73/162
See application file for complete search history.

(56) References Cited

U.S. PATENT DOCUMENTS

| | | | |
|---|---|---|---|
| 2,965,971 A | | 12/1960 | Pomernacki |
| 4,024,757 A | * | 5/1977 | Raess et al. ................... 73/162 |
| 4,252,023 A | | 2/1981 | Pomernacki |
| 4,335,612 A | * | 6/1982 | Yasugi et al. .................. 73/593 |
| 4,788,856 A | | 12/1988 | Felger |
| 4,799,337 A | | 1/1989 | Kotthaus |
| 4,931,949 A | | 6/1990 | Hernandez et al. |
| 5,000,632 A | | 3/1991 | Stadtfeld |
| 5,257,882 A | | 11/1993 | Stadtfeld et al. |
| 5,299,390 A | * | 4/1994 | Kato et al. ..................... 451/47 |
| 5,307,676 A | | 5/1994 | Gutman |
| 5,315,790 A | | 5/1994 | Kish et al. |
| 5,341,699 A | | 8/1994 | Rouverol |

(Continued)

FOREIGN PATENT DOCUMENTS

DE 43 13 533 A1 10/1994

*Primary Examiner*—Jacob K. Ackun, Jr.
(74) *Attorney, Agent, or Firm*—John Kajander

(57) ABSTRACT

A method for lapping the gears of a gear set as well as a gear lapping system. The gear set generally includes a first gear in meshed engagement with a second gear, each of the first and second gears having a plurality of gear teeth each with drive and coast flank surfaces. The method includes the steps of lapping the gear set by rotating the first gear in a first direction while the first gear is in mesh with the second gear. The method further includes sensing the vibrations occurring in the gear mesh during rotation and controlling the step of lapping based on the sensed vibrations. The gear lapping system includes an automated lapping machine that is adapted to lap the gear set including a ring gear and a pinion gear. The automated lapping machine is adapted to lap the gear set by rotating at least one of the ring and pinion gears while in mesh, in the presence of a lapping compound, and while translating the gear mesh back and forth across the gear flank surfaces for a plurality of cycles. A vibration sensor is operably coupled to the automated lapping machine and senses the amplitude of vibration and energy occurring in the gear mesh during each of the plurality of cycles. This sensor produces a vibration output signal that is proportional to the amplitude of the vibration energy. An automated controller is adapted to receive the vibration output signal as well as to calculate and transmit a control command signal to the automated lapping machine based on the amplitude of the vibration energy.

20 Claims, 11 Drawing Sheets

U.S. PATENT DOCUMENTS

| | | | |
|---|---|---|---|
| 5,609,058 A * | 3/1997 | Gnadt et al. .................. 73/162 |
| 5,809,843 A | 9/1998 | Barger et al. |
| 5,901,454 A | 5/1999 | Stadtfeld et al. |
| 6,033,287 A | 3/2000 | Wiener et al. |
| 6,120,355 A * | 9/2000 | Stadtfeld et al. ............. 451/47 |
| 6,217,421 B1 | 4/2001 | McGlasson et al. |
| 6,230,578 B1 | 5/2001 | Kim et al. |
| 6,282,502 B1 | 8/2001 | Sundaresan et al. |
| 6,389,888 B1 | 5/2002 | Juranitch et al. |
| 6,390,893 B1 | 5/2002 | Stadtfeld et al. |
| 6,481,307 B1 | 11/2002 | Klingelnberg |
| 6,507,789 B1 | 1/2003 | Reddy et al. |
| 2002/0170373 A1 | 11/2002 | Kim et al. |
| 2003/0019285 A1 | 1/2003 | Juranitch et al. |

* cited by examiner

METHOD AND APPARATUS FOR LAPPING GEARS

FIELD OF THE INVENTION

The present invention relates to a method of lapping the gears of gear sets. More particularly, it relates to a method and apparatus for detecting defects on the teeth of the gears and controlling a lapping machine based on the detected defects.

BACKGROUND OF THE INVENTION

Lapping is a well-established process for finishing the tooth surfaces of certain types of gear sets. It is particularly well suited for gear sets comprising a ring gear and associated pinion gear, such as such as bevel or hypoid gear sets. Such gear sets are frequently employed in automotive applications, such as driveline components, including the ring and pinion gear associated with a differential in an automotive vehicle In the lapping process, a ring gear and pinion gear are each typically mounted to rotatable spindles. These spindles are also frequently adapted such that either the ring gear, pinion gear or both may be translated back and forth with respect to the other gear (i.e., via pinion-cone motion, gear-cone motion and vertical and horizontal mounting offsets). While the gears of the gear set are in meshing engagement, an abrasive lapping compound is introduced to the gear such that the rotation, location, speed and torque of the gears causes the abrasive in the lapping compound to remove or lap material from the faces of the gear teeth. The purpose of lapping is to improve the performance of the gear set in application with regard to criteria which are frequently referred to as noise, vibration and harshness (NVH). NVH is an automotive industry term associated with the treatment of vibration and audible sounds. Harshness usually refers to treatments of transient frequencies or shock.

The manufacturing processes employed to make the ring gear and pinion gear are complex processes comprising numerous metal-working, heat treatment and finishing processes. Following the manufacturing process, either the ring gear, pinion gear, or both, may not conform to their design specifications. Such non-conformance means that the teeth of these gears may not properly mesh with one another. This non-conformance also produces vibration energy as the teeth of the gears are rotated while in mesh. This vibration energy can produce various vibration waveforms, including audible noise. One type of waveform resembles a series of vibration energy spikes or pulses and can be caused by discrete defects, such as nicks (positive material or dents in the gear flank that cause a raised material condition on the surface) or other asperities on the gear face. If a nick is present where the two mating gears contact, the resulting disturbance may be heard or felt by a vehicle operator depending on the insulation of the underbody and the severity of nick or defect. Another type of waveform is more continuous in nature and results from mesh of the gears as they are rotated, and is frequently referred to as the mesh frequency. The NVH performance of the vehicle is strongly influenced by the amount of vibration energy generated when the pinion and ring gear are rolled together in meshing engagement. Therefore, a variety of techniques are currently employed, such as grinding and lapping, to remove defects such as nicks, eliminate index and pitch variations, and improve the degree to which the teeth of the ring gear and pinion gear mesh smoothly and continuously with one another, thereby improving the NVH performance of vehicles into which these components are installed.

In order to assess the NVH performance of gear sets, various testing machines and methods are employed at various stages of manufacture and assembly. For example, various nick detection approaches are currently offered by gear equipment vendors. One nick detection approach utilizes the linear displacement of a glass scale or the radial displacement of a photo-encoder on the central and/or radial axis of the ring gear during a pre-roll of a lapping operation (i.e. pre-roll occurs before lapping and during run out inspection on a CNC machine). Another vendor utilizes a similar concept of detection, and both correlate the data to a spike seen in the run out curve and accumulated pitch. Both vendors establish their threshold limits that define a nick around these generated curves. However, this inspection technique adds time to the current manufacturing cycle, and utilizes a low speed (roughly 100 rpm) double flank roll at the mounting distance of the gear set. In addition, the sensitivity of the measurement is such that it does not detect all nicks that are capable of diminishing the NVH performance of a gear set. As a further example, in order to address NVH concerns in the gearing stage, gear sets are sometimes rolled together using a basic perpendicular spindle machine and the gear sets are then examined by a trained operator for acceptable contact pattern position and operating noise levels. This analysis occurs after the final machining operation of a gear and/or gear set—lapping or grinding. Any remaining NVH disturbance due to nicks or the overall mesh must be located visually and audibly by the operator, and then must be removed physically by a hand grinder. In some cases, due to teeth cutting errors, heat treatment distortion and other causes, the gear set must be scrapped.

As another example, hypoid gear sets are commonly tested using a single flank test, which is a process that inspects transmission error and rotational characteristics in the dynamic condition. The transmission error is measured based upon the premise that the transmitted dynamics from the pinion to the ring gear will have some deviation from the theoretical transmission. Photo encoders and linear glass scales on these test machines inspect this deviation and record it in terms of arc seconds of radial displacement. These testing machines may also employ vibration sensors which are adapted to produce an output signal in response to sensed vibration energy that is produced while the gears are rotated while in mesh.

The vibration sensor or transducer is frequently a piezoelectric accelerometer and produces an output signal that is proportional to the magnitude of the vibration energy produced by the gear set rotating in mesh. This output signal may be used in several ways. One way is to observe the amplitude of the characteristic time-based waveform of the vibration sensor. Another way of using the vibration sensor is to perform a Fast Fourier Transform (FFT) of the output signal or to observe the characteristic response of the gear set during rotation in the frequency domain, such as over a range of rotation frequencies and other characteristic variables associated with the meshed gears, including the torque applied to the pinion or the ring gear, any braking torques applied to either the ring gear or the pinion gear, backlash, the degree to which the gears are meshed with one another and other factors.

While the typical single flank testing machines incorporating these vibration sensors provide useful information, they have a number of limitations. First, in order to test gears in conjunction with the use of lapping to improve their NVH characteristics, it is necessary to remove the gear sets from the lapping machines, remove the lapping compound, set them up in mesh on a testing machine, and then run various tests to determine the NVH characteristics of the gear set being lapped. This lapping/testing approach is undesirable in a high volume production environment because of the cost and time associated with transitioning the gear sets from the production lapping equipment to the testing equipment and back again if need be for additional lapping and/or testing. In addition, most single flank testing is done at rotational speeds that are significantly lower than the rotational speeds at which lapping is done and at which the gear sets will be used in their final application. While attempts have been made to correlate the amplitude of the time-based waveform and/or the frequency-based FFT output produced by testing with the NVH characteristics of the gear sets in the lapping environment or in their final applications, such efforts have had very limited success, because of the complexity of the factors to be considered, including the variability in the set-up of the gear set in manufacturing, final assembly and application, the broader range of rotational speeds in manufacturing and application versus testing, contact over a range of positions on the gear flank in manufacturing and application versus just one position during testing, as well as other factors.

As a final example, in areas of final assembly, NVH analysis and acceptance are being utilized on both the carrier assembly and the final axle assembly utilizing vibration sensors to sense and record any vibrations. However, all of these test methods have the disadvantage of being separate from the lapping process, and thus add cost and time to the production cycle. Also, they provide relatively little quantitative information about the defects detected, the necessary corrective action required and whether a particular corrective action has produced the desired effect, absent retesting once the corrective measure has been taken.

In addition to the limitations of existing test equipment and methods, customers are continually placing a higher demand on NVH performance of gear sets and making the related acceptance criteria more stringent. As such, it is highly desirable to establish a lapping apparatus and lapping methods that provide an accurate indication of the vibration energy characteristics of the gear set while it is in the production lapping equipment and during the lapping process so that the production of gear sets that will have acceptable NVH characteristics in their final application can be assured. It is also highly desirable to provide feedback control of the lapping process by measurement of the characteristic vibration energy output of the gear set while it is being lapped.

It is therefore desirable to realize an apparatus and method for lapping that may be controlled based on the vibration energy output of the gear set while it is lapping. It is also desirable to provide an apparatus and method that provides closed loop control of the lapping process based on the vibration energy output from the gear set. It is also desirable to identify gears sets that may not be corrected by lapping alone, during the lapping process, so as to avoid the manufacturing, assembly and other costs associated therewith.

SUMMARY OF THE INVENTION

In view of the above, the present invention is generally directed to a method for lapping the gears of a gear set as well as a gear lapping system. The gear set generally includes a first gear in meshed engagement with a second gear, each of the first and second gears having a plurality of gear teeth each with drive and coast flank surfaces. The method includes the steps of lapping the gear set by rotating the first gear in a first direction while the first gear is in mesh with the second gear. The method further includes sensing the vibrations occurring in the gear mesh during rotation and controlling the step of lapping based on the sensed vibrations. The gear lapping system includes an automated lapping machine that is adapted to lap the gear set including a ring gear and a pinion gear. The automated lapping machine is adapted to lap the gear set by rotating at least one of the ring and pinion gears while in mesh, in the presence of a lapping compound, and while translating the gear mesh back and forth across the gear flank surfaces for a plurality of cycles. A vibration sensor is operably coupled to the automated lapping machine and senses the amplitude of vibration and energy occurring in the gear mesh during each of the plurality of cycles. This sensor produces a vibration output signal that is proportional to the amplitude of the vibration energy. An automated controller is adapted to receive the vibration output signal as well as to calculate and transmit a control command signal to the automated lapping machine based on the amplitude of the vibration energy.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
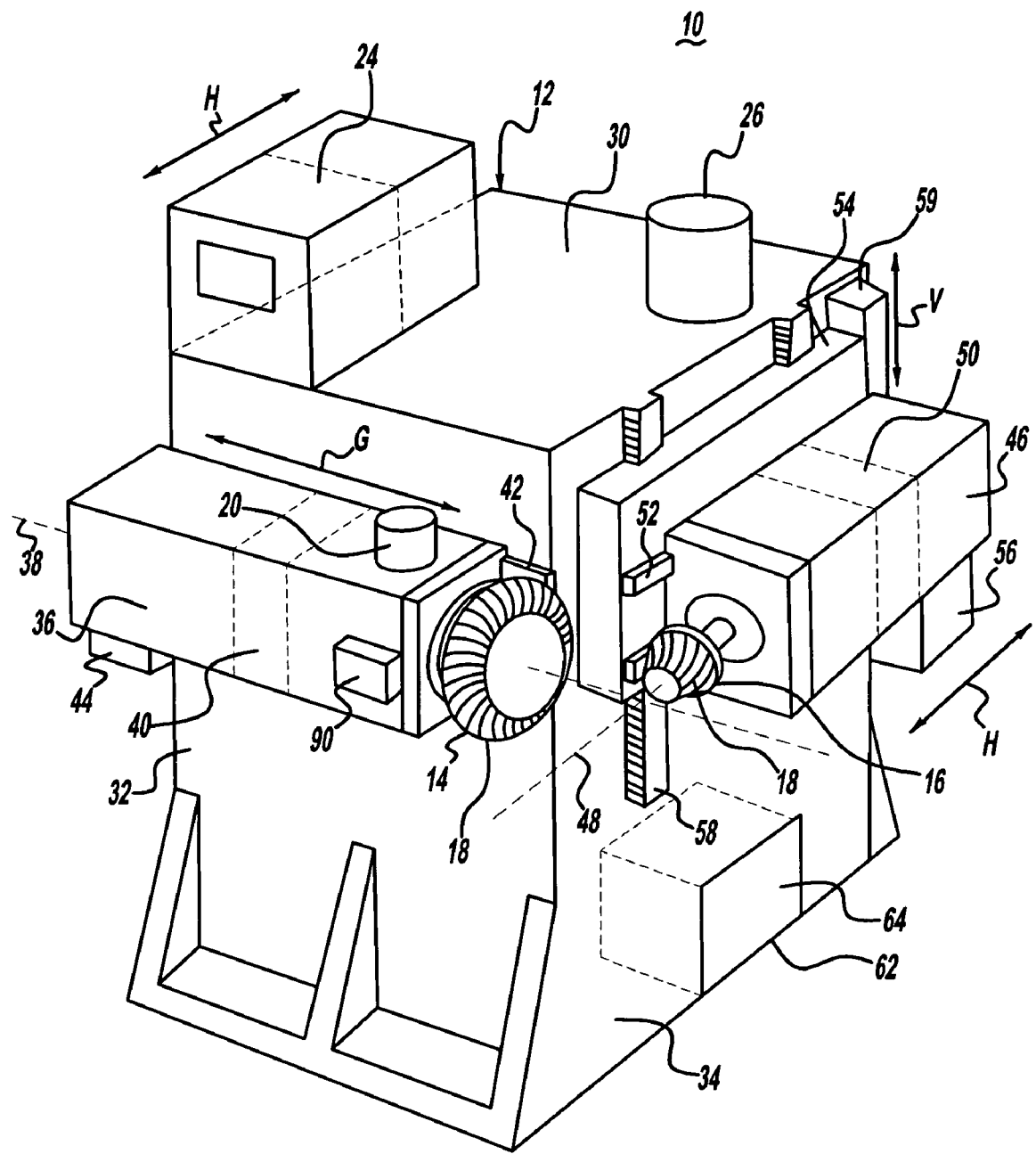
FIG. 1 schematically illustrates a first embodiment of a lapping system in accordance with the present invention.
Figure 2:
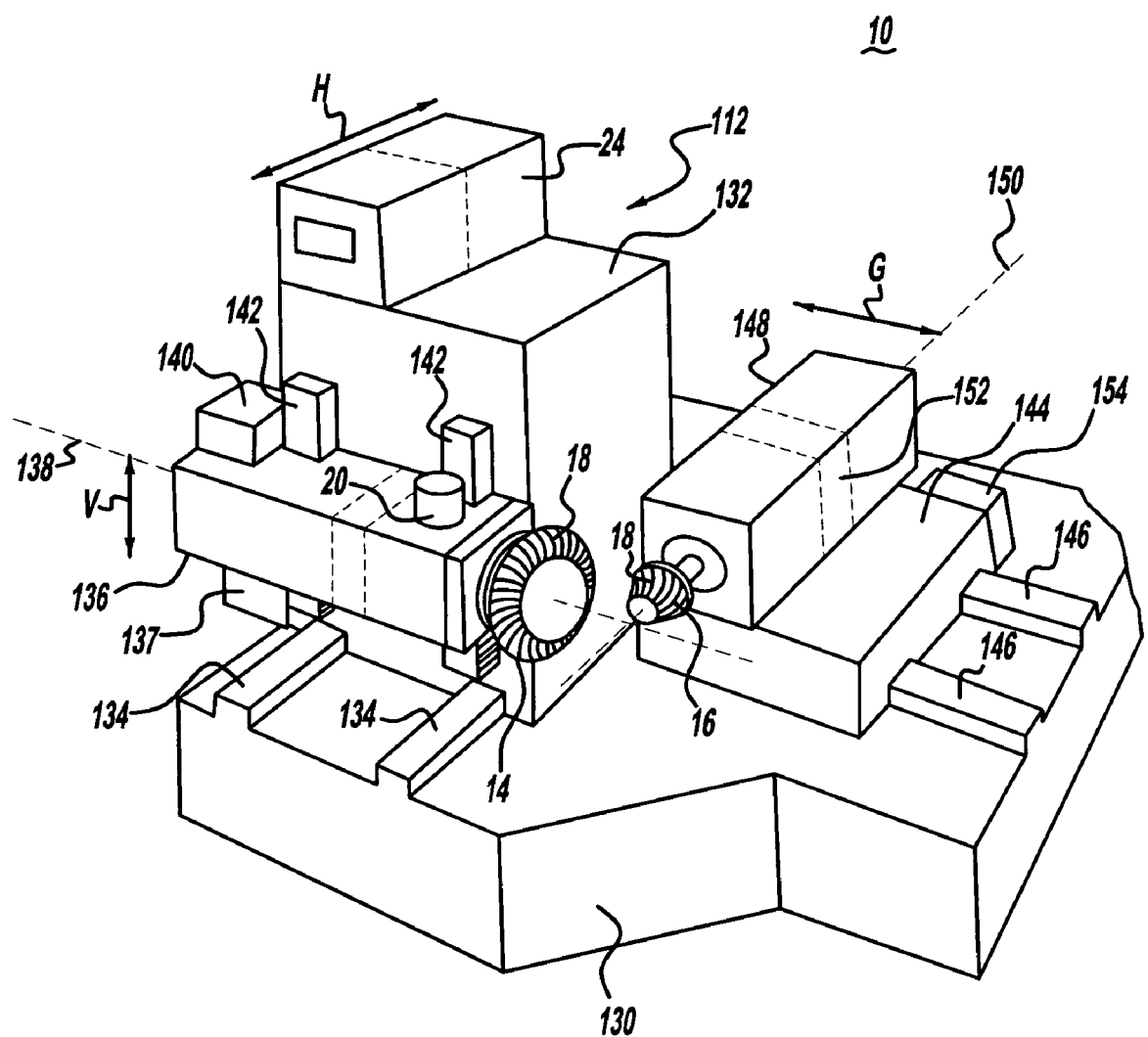
FIG. 2 schematically illustrates a second embodiment of a lapping system in accordance with the present invention.
Figure 3:
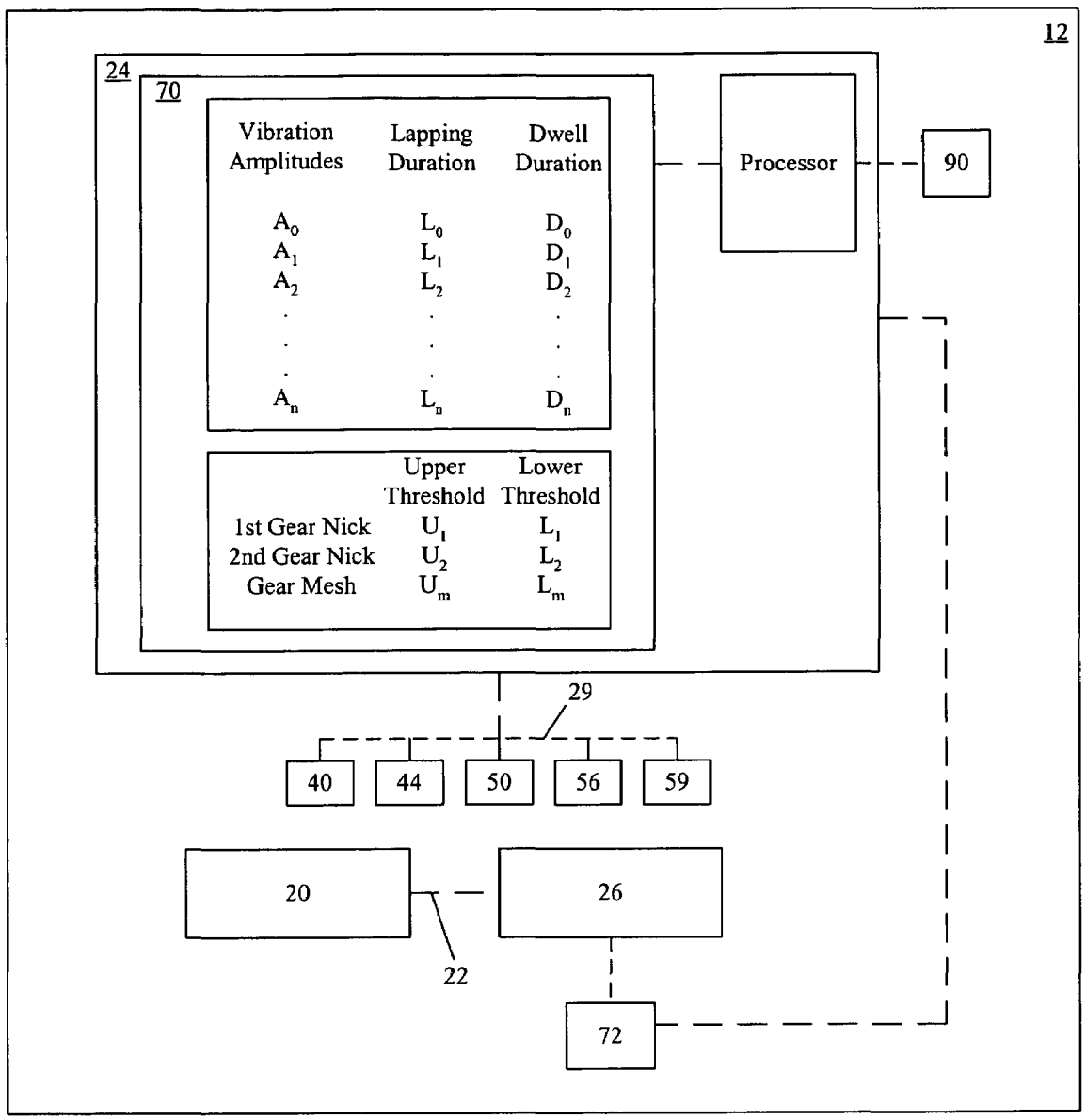
FIG. 3 is a block diagram of a lapping system of the present invention.

FIGS. 1–3 illustrate a gear lapping system 10 of the present invention. The system 10 includes an automated lapping machine 12 that is adapted to retain the mating gears 14,16 of a gear set 18 in mesh and exercise the gear set by rotation of the gears and the use of a pinion-cone motion (and possible gear cone motion and vertical and horizontal mounting offsets) between them and that is adapted to receive control inputs from an automated controller 24. The gear set 18 includes the first gear 14, having a plurality of first gear teeth each with drive and coast gear flank surfaces, and the second gear 16, having a plurality of second gear teeth each with drive and coast gear flank surfaces. During lapping the first and second gear teeth are in mesh and are indexed so that a starting position on the gear flank surfaces may be known (currently, the lapping cycle is based on time). The system 10 further includes a vibration sensor 20 that is adapted to provide a characteristic output signal 22 in response to vibration energy caused in the mesh by nicks or gear mesh defects in one or more of the mating gears during the exercise of gear set 18. A signal analyzer 26 is adapted to receive and analyze the characteristic output signal 22 from said vibration sensor 20 and provide analyzer outputs 28 that are indicative of the analyzed characteristic output signal 22. The automated controller 24 is adapted to receive the analyzer outputs 28 and calculate and transmit control command signals 29 to the automated lapping machine 12. Accordingly, the illustrated embodiment of the invention provides closed loop control of the lapping machine 12 based on nick detection and/or gear mesh analysis to effect a reduction in the vibration energy of the gear set.

Referring to FIG. 1, one embodiment of an automated lapping machine 12 comprises a single column 30 that may also be thought of as the machine frame. Column 30 comprises at least three sides, preferably four sides, with at least two of the sides, first side 32 and second side 34, being perpendicular to one another. Each of the first and second sides comprises a width and a height (as viewed in FIG. 1). The lapping machine is preferably housed in a housing (not shown) having doors or other means to enclose the lapping machine while providing access to the gears 14,16 and elements of the lapping machine 12 as are described below.

First side 32 includes a first spindle 36 which is rotatable about first longitudinal axis 38. A torque mechanism, such as a first spindle drive motor 40 or other conventional means such as the use of torsional springs for compliant spindles, is operatively associated with the first spindle 36 to act as a drive motor or torque resistance source. First spindle 36 is movable along the width of first side 32 in direction G (gear cone movement) on first ways 42 attached directly to or comprising a part of column 30. Movement of first spindle 36 in direction G is provided by G-drive motor 44, preferably through a direct-coupled ballscrew (not shown). First gear 14, preferably a ring gear, is releasably mounted to first spindle 36 by suitable work holding equipment (e.g., a chuck, not shown) as is known in the art.

Second side 34 includes a second spindle 46 which is rotatable about second spindle axis 48 and is preferably driven or rotated by a second spindle drive motor 50, which is preferably a direct drive, liquid-cooled motor, mounted between front and rear spindle bearings (not shown). Second spindle 46 is movable along the width of second side 34 in direction H on second ways 52 attached to or comprising a part of slide 54. Movement of second spindle 46 in direction H is provided by H-drive motor 56, preferably through the use of a direct-coupled ballscrew (not shown). Preferably, a second gear 16, illustrated as a pinion gear having a smaller diameter than first gear 14, is releasably mounted to a second spindle 46 by suitable work holding equipment (not shown) as is known in the art. Workpiece spindle 46 is also movable along the height of second side 34 in direction V since slide 54 is movable in the V direction via ways 58 with movement being provided by V-drive motor 59, preferably through a direct-coupled ballscrew. Directions G, H and V are mutually perpendicular with respect to one another. For practical purposes as well as for purposes of illustration, in FIG. 1, the V direction is substantially vertical. The second gear 16 motion (i.e. vertical and horizontal movements or radial and axial movements of the second gear 16) is accomplished via the second spindle 46 and the backlash via the first spindle 36.

Movement of first spindle 36 in direction G, second spindle 46 in direction H, slide 54 in direction V, as well as first spindle rotation and second spindle rotation, may be imparted by separate drive motors capable of independent control and operation with respect to one another or may move simultaneously with one another. Each of the respective motors or spindles are associated with a suitable control mechanism, such as a feedback control mechanism comprising a linear or rotary encoder (not shown), as part of a system which controls the operation of the drive motors in accordance with instructions input to the automated controller 24. Such controllers are well known, such as the GE Fanuc Model 16i controller.

Lapping machine 12 also comprises a lapping compound recirculation apparatus 62 for holding and recirculating lapping compound to the workpieces. Those skilled in the art will appreciate that the lapping machine 12 may be controlled, such as via controller 24, to perform the nick detection and gear mesh analysis described herein either in the presence or in the absence of communication of the lapping compound to the mating teeth of the gear set 18. Apparatus 62 preferably includes a tank 64 that may be placed under second spindle 46 adjacent to second side 34 as shown schematically in FIG. 1. In this manner, the tank can remain within the exterior sheet metal housing thus keeping the machine footprint size at a minimum. Also, a cutout area may be included at an area of the column remote from the spindles for placement of any necessary electrical transformers. With this arrangement, such electrical components can also stay within the exterior sheet metal enclosure and yet be spaced far enough from the spindles such that heat radiating from the electrical components will not adversely influence the accuracy of the spindles or other tolerance sensitive elements.

FIG. 2 illustrates a second embodiment of the present invention, utilizing a lapping machine 112 of somewhat different construction than that shown in FIG. 1, comprising a frame 130 on which is located a first column 132 movable in a direction H via first ways 134 which are attached to or comprise a part of frame 130. A first spindle 136 for rotating the first gear 14 of the gear set, such as ring gear 14, about first longitudinal axis 138 of first spindle 136 is mounted to first column 132. Movement of first spindle 136 in direction H is provided by H-drive motor 137. First spindle 136 is also movable along second ways 142 in a direction V such as by V-drive motor 140, preferably through a direct-coupled ballscrew (not shown).

Lapping machine 112 also includes a second column 144 movable in a direction G on frame 130 via third ways 146. Located on second column 144 is a second spindle 148 for rotating the second gear 16 of gear set 18, such as pinion 16, about second longitudinal axis 150 of second spindle 148. Second spindle 148 is preferably driven or rotated by second spindle drive motor 152. Movement of second spindle 148 in direction G is provided by G-drive motor 154, preferably through a direct-coupled ballscrew (not shown). Directions G, H and V are mutually perpendicular with respect to one another. The second gear 16 motion (i.e. vertical and horizontal movements or radial and axial movements of the second gear 16) is accomplished via the first spindle 136 and the backlash via the second spindle 148.

Referring to FIG. 2, movement of first spindle 136 in directions H and V, second spindle 148 in direction G, as well as first and/or second spindle rotation is imparted by the separate drive motors. As in the embodiment shown in FIG. 1, the motors are capable of independent control and operation with respect to one another or may move simultaneously with one another. Each of the respective motors shown in FIG. 2 is associated with a suitable control mechanism and can be controlled independently by a suitable controller as described previously with regard to the motors shown in FIG. 1.

The embodiment of FIG. 2 can also incorporate an apparatus (not shown) for storing, pumping and recirculating lapping fluid as has been previously illustrated and described in conjunction with FIG. 1.

As with conventional lapping systems, the gears are placed in meshed engagement at a predetermined backlash, the drive spindle (e.g., second spindle 46) is rotated in a first direction at a predetermined speed, and a resistance torque is applied to the driven spindle (e.g., first spindle 36) in a manner generally known in the art. By way of example rather than limitation, for a gear set having eleven (11) teeth on the pinion and forty-one (41) teeth on the ring gear for application in an automobile's rear axle, a rotational speed of 2000 rpm, a backlash of 0.005 inches, and a torque of 8–15 ft-lbs may be used to perform nick detection and gear mesh analysis while lapping the drive flank surfaces of the first and second gears. Similarly, a rotational speed of 2000 rpm, a backlash of 0.005 inches, and a torque of 8–15 ft-lbs. may be used to perform nick detection and gear mesh analysis while lapping the coast faces of the first and second gears. Notwithstanding the above provided representative values of rotational speed, resistance torque, and backlash, those skilled in the art will appreciate that the above provided values are for illustrative purposes only and that various modifications may be made without departing from the scope of the invention as defined by the appended claims.

As noted above, the vibration sensor 20 is adapted to provide a characteristic output signal 22 in response to vibration energy caused in the meshed mating gears during the exercise of gear set 18. Suitable sensors may include displacement sensors, velocity sensors, or accelerometers. Vibration sensor 20 is preferably an accelerometer. Suitable accelerometers include both single axis accelerometers as well as multi-axis accelerometers, such as 3-D accelerometers. Single axis accelerometers are preferable because of the reduced complexity of the sensor as well as the associated signal processing and analysis requirements. Vibration sensor 20 may be mounted at any location where the vibration energy may be detected when the first gear and second gear are rotated in mesh. It is preferred that vibration sensor 20 be rigidly attached to lapping machine 12 at a location, such as in operative associated with the first spindle and/or second spindle, where the amplitude of the vibration energy may be expected to be a maximum. Generally, it is preferred that a single axis accelerometer be rigidly attached to the spindle to which the ring gear is attached in an orientation such that the axis of the accelerometer along which accelerations may be measured is oriented vertically or in the V direction. Any suitable accelerometer that is capable of providing an output in response to accelerations of the magnitude produced by a nick may be utilized, such as a model 356D11 accelerometer produced by IMI Sensors—PCB Piezotronics of Depew, N.Y. which provides acceleration data up to 4,000 Hz.

Given the above generally described structural components of the gear lapping system 10, a method of performing nick detection and gear mesh analysis for a gear set using the lapping system 10, as well as a method of closed loop control for the lapping machine 12, according to the present invention will now be described. In the embodiment described in detail herein the closed loop control is based on one or more of (1) the detection of nicks on the respective gears (i.e., nick detection) and (2) the detection of vibrations attributable to the meshing of the gears of the gear set from sources other than nicks (i.e., gear mesh analysis). These operations are described herein as being used in combination through the use of a single controller 24. However, those skilled in the art will appreciate that the controller may be configured for the use of one or both of the described operations. Further, while the preferred implementation of the present invention incorporates closed loop control of the lapping apparatus based on nick detection and gear mesh analysis, it is contemplated that the nick detection and gear mesh analysis may be beneficially incorporated into a lapping system without closed loop control.

In the illustrated embodiment, the system 10 is shown to include a signal analyzer 26 (FIG. 3) which is separate from the vibration sensor 20 and controller 24. Notwithstanding this representative illustration, those skilled in the art will appreciate that the function of the signal analyzer 26 may be incorporated into the controller 24 or the vibration sensor 20 or provided as a separate component as described herein. In an embodiment where the signal analyzer 26 is separate from the controller 24, the output signals 22 are first processed by the signal analyzer 26 which is adapted to receive, analyze and store or capture the output signals 22 and provide an analyzer output signal 28 that is indicative of the vibration sensor output signals 22. The signal analyzer 26 receives the output signal 22 from the vibration sensor, communicates with a timer 72, and converts the received signal into a time-domain amplitude of vibration accelerations. It is preferred that signal analyzer 26 be adapted to divide the time-domain signal into a plurality of time segments and transform the time-domain signal of each segment into a corresponding frequency-domain spectrum as is described further below. A typical signal analyzer will perform data analysis on the input data from the selected transducer. The signal is digitized and processed in the frequency or order domain. The processing of the signal may include a number of techniques generally known in the art. For example, envelope band pass filtering may be used to enhance signals by separating high frequency from low frequency vibrations. As is discussed in greater detail below, the output from the analyzer may be used by the controller to identify selected frequencies or orders of concern, the vibration magnitude of which is preferably then used to control the process, such as via a feedback loop or signal a go or no-go condition.

Figure 5:
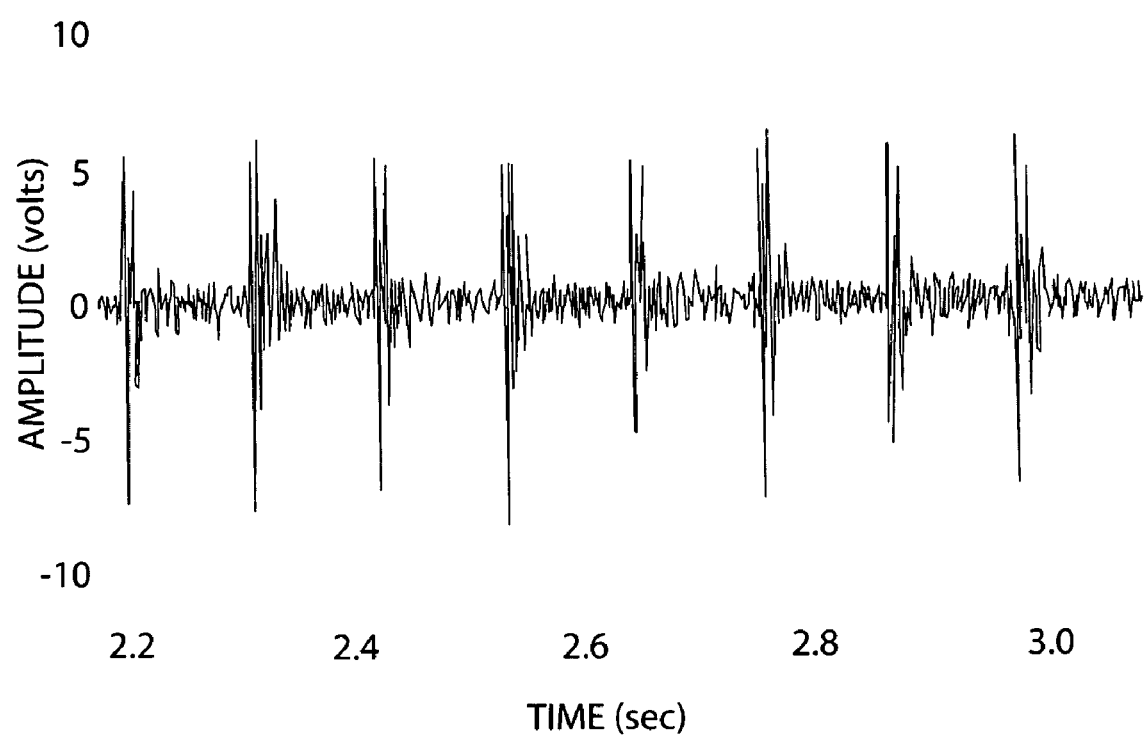
FIG. 5 is a measured time-domain form illustrating vibration energy in the form of sensor accelerations due to a gear nick.
Figure 6:
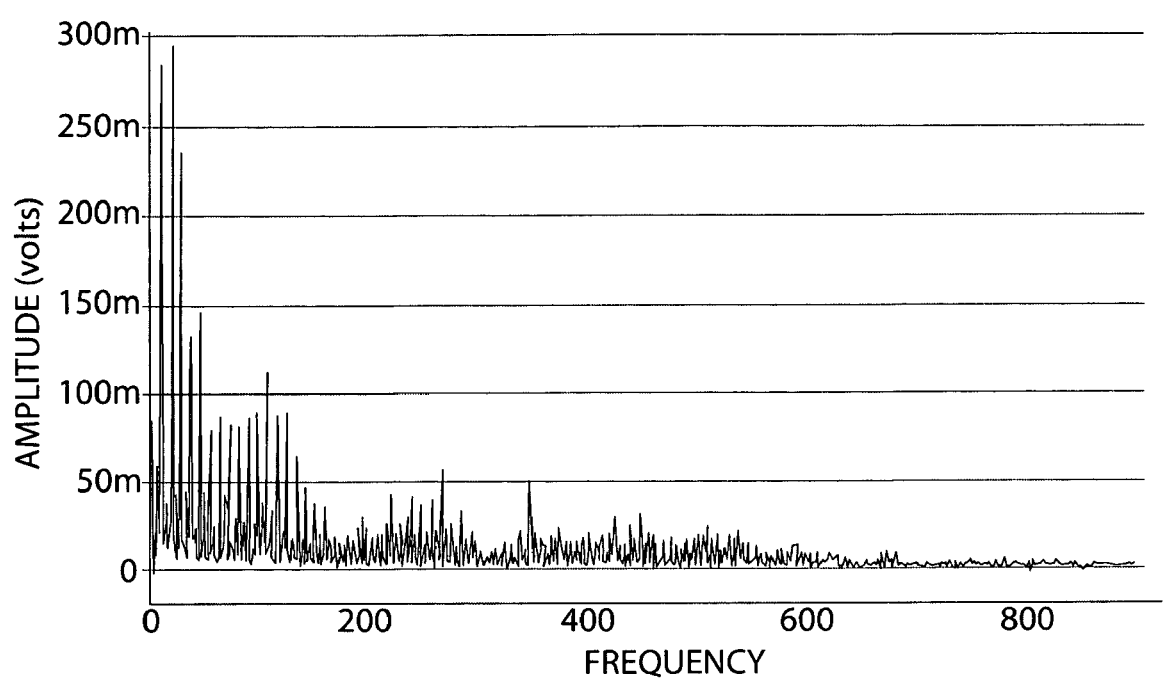
FIG. 6 is a FFT transformation illustrating first gear nicks at the second gear rotational harmonic (where the $2^{nd}$ gear is the driven gear) using band pass filtering around the gear mesh frequencies.
Figure 7:
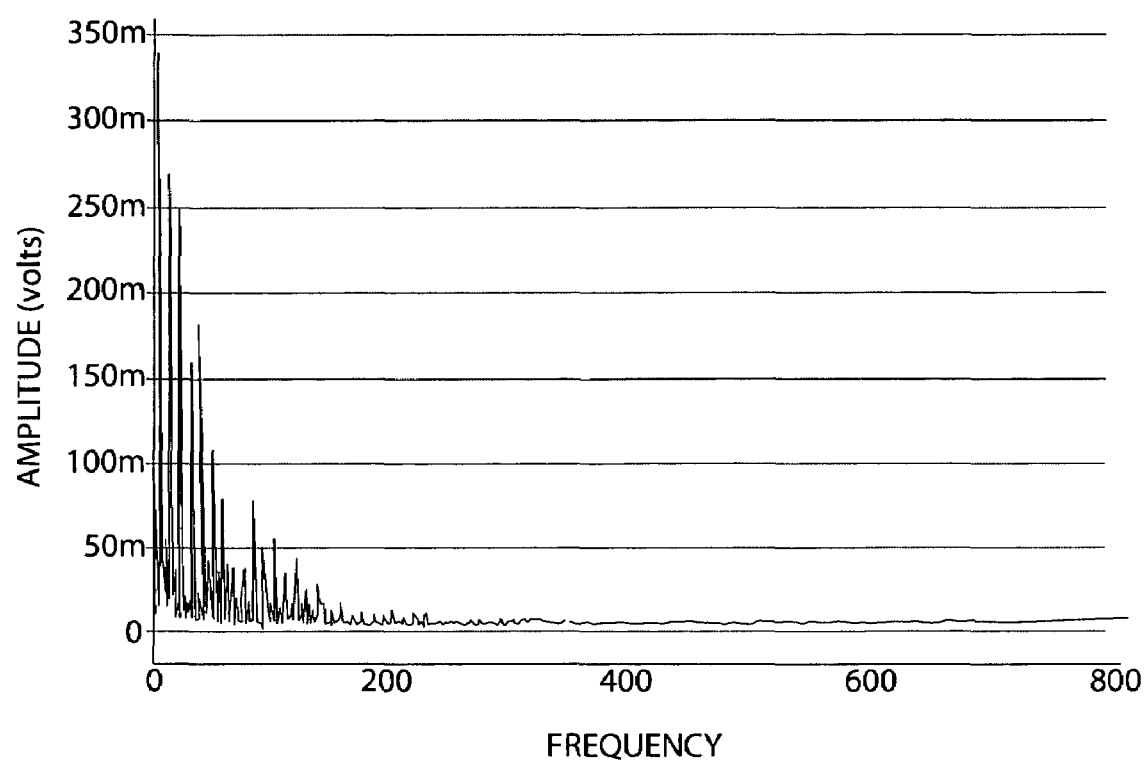
FIG. 7 is a FFT transformation illustrating gear nick(s) at the gear rotational harmonic utilizing low pass filtering.
Figure 8:
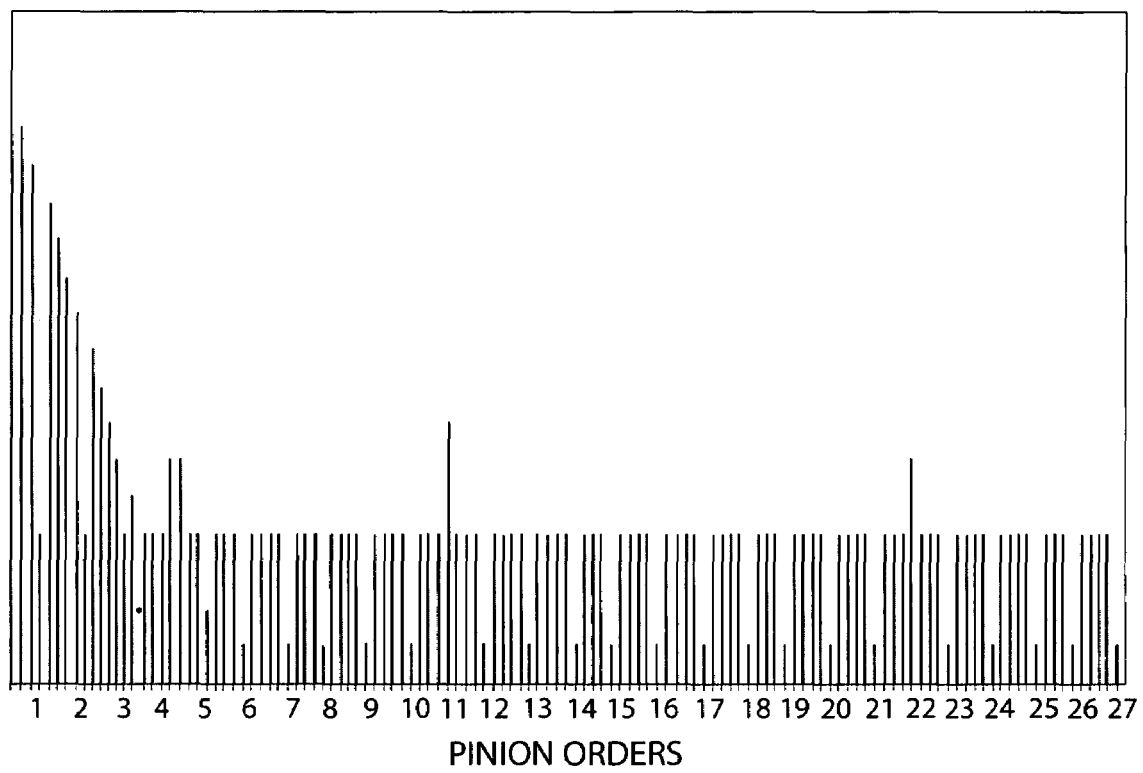
FIG. 8 is a theoretical depiction of a FFT transformation illustrating second gear nicks at the second gear rotational harmonic.
Figure 9:
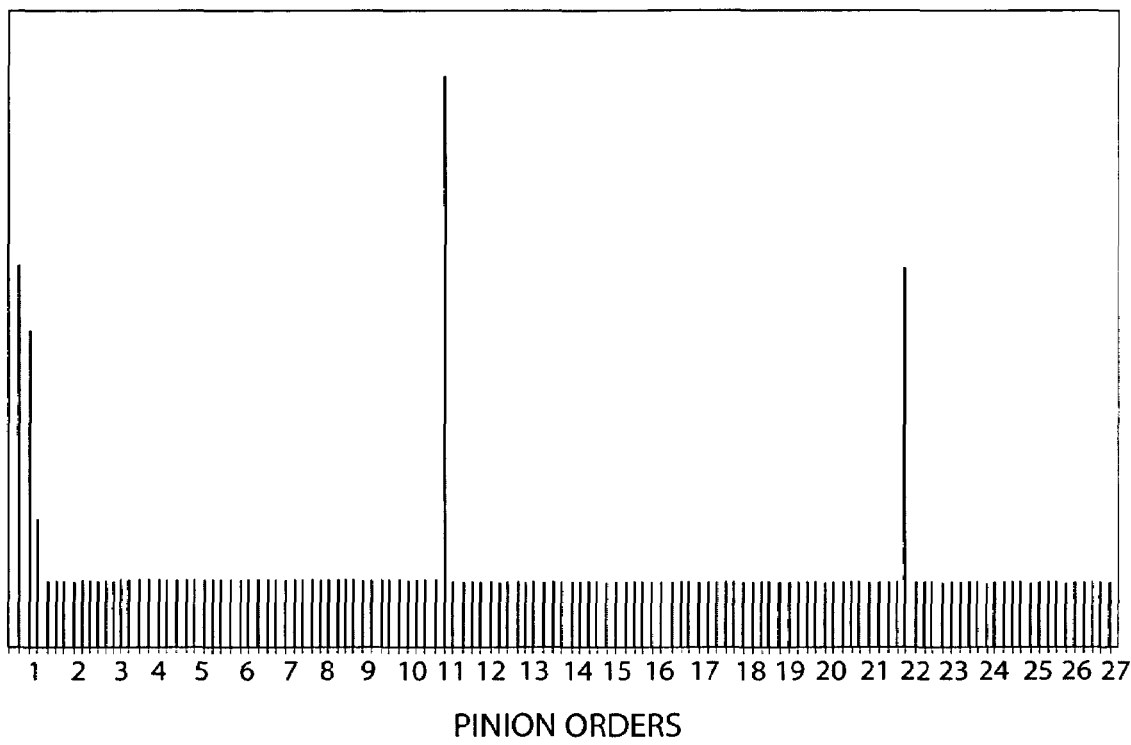
FIG. 9 is a theoretical depiction of a FFT transformation illustrating high mesh harmonics.
Figure 10:
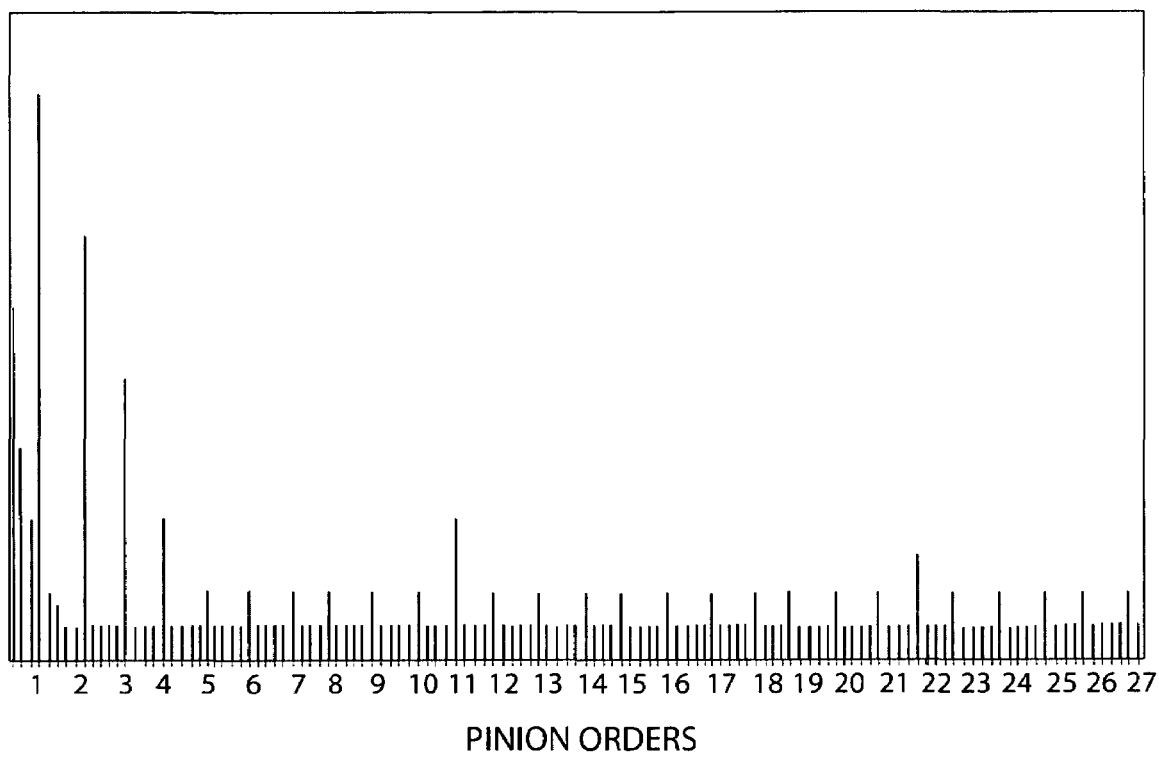
FIG. 10 is a theoretical depiction of a FFT transformation illustrating first gear harmonics where the first gear is the driving gear.
Figure 11:
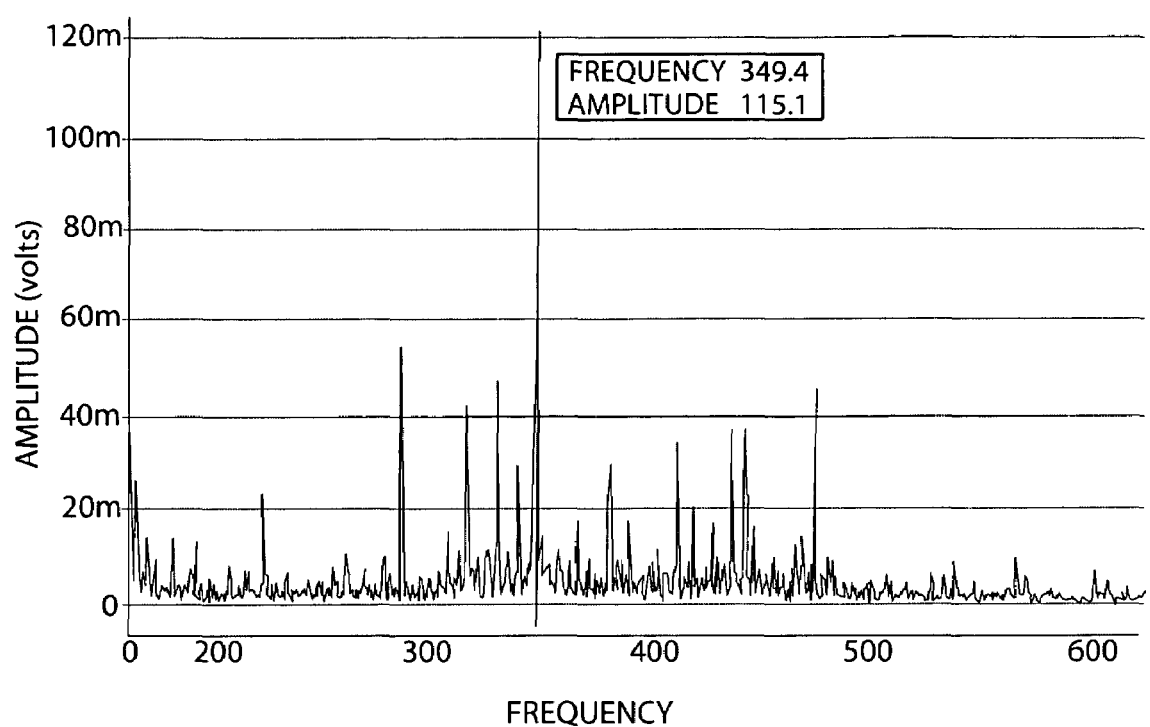
FIG. 11 is a FFT transformation illustrating high mesh harmonics with ring and pinion sidebands.

FIG. 5 provides a graphical illustration of a representative time domain waveform showing a vibration energy spike that repeats at an identifiable interval. As will be more fully explained below, the time domain waveform of FIG. 5 is illustrative of a nick on one of the first or second gears. The signal analyzer 26 may also be configured to transform the time-domain waveform into a frequency-domain spectrum. This transformation may be performed through the use of a fast fourier transform (FFT) or other suitable technique generally known in the art. FIGS. 6–11 graphically illustrate a FFT spectrum of vibration energy spikes of amplitude representative of vibrations occurring during the lapping of a nick. More specifically, FIG. 6 illustrates a measured ring gear nick using band pass filtering. FIG. 7 illustrates a measured ring gear nick using low pass filtering. FIG. 8 illustrates a theoretical ring gear nick with increased ring gear harmonics in addition to a gear mesh defect. FIG. 9 illustrates a theoretical depiction of a gear set with high gear mesh harmonics. FIG. 10 illustrates a theoretical pinion nick with high pinion harmonics. FIG. 11 illustrates a measured gear set with a high fundamental mesh harmonic in addition to having ring and pinion gear sideband harmonics. Programmable signal analyzers of the type described herein are generally known in the art.

The analyzer output signals 28 (whether in the time-domain, frequency-domain, or other form) are communicated to the controller 24 which is adapted to generate and transmit control command signals 29 to the controllable components of the automated lapping machine 12. By way of example rather than limitation, appropriate control command signals may be sent to a separate machine controller or directly to the controllable components of the machine. For example, as is more fully described below, the control commands may be communicated to a pinion drive motor to control the rotational speed of the gear set, to one or more of the motors controlling the relative positions of the gears while in mesh, or to stop the lapping performed by the machine.

Figure 4:
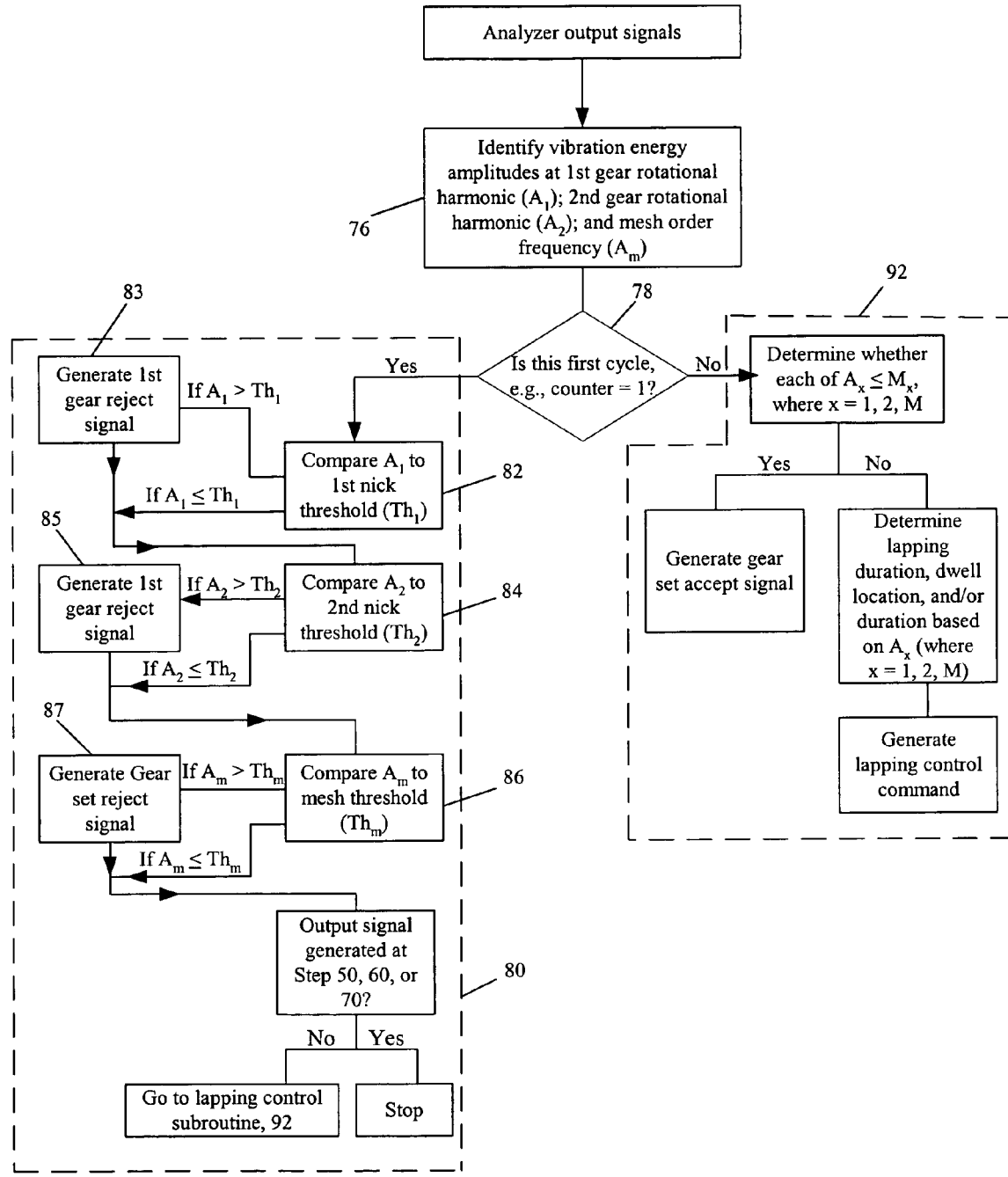
FIG. 4 is a flow chart illustrating an embodiment of the control methodology according to the present invention.

A representative control methodology for the controller 24 is illustrated in FIG. 4. In Step 76, the controller 24 or signal analyzer 26 is adapted to fully analyze the output signals 28, such as by capturing maximum of any vibration peaks or spikes occurring in the spectrum, and more particularly by capturing maximum associated with any peaks or spikes occurring with particular bands of the frequency spectrum, such as bands associated with the rotational harmonics of the first and second gears and the mesh order frequency. More particularly, the controller 24 or signal analyzer 26 identifies and captures maximum vibration energy amplitudes and identifies vibrations that repeat at one or more of a first gear rotational harmonic (A1), a second gear rotational harmonic (A2), and a mesh order frequency (A3). Vibrations that repeat at a first gear rotational harmonic are identified as first gear nick vibrations and the maximum first gear nick vibration is preferably stored in an appropriate data structure in the controller for later processing. Similarly, peak vibrations repeating at the second gear rotational harmonic are defined as second gear nicks and peak vibrations repeating a frequency indicative of the first and second gear rotational harmonics (a.k.a. gear set mesh orders) are identified as gear mesh vibrations. Those skilled in the art will appreciate that because the rotational frequency of each of the gears is known, a variety of techniques may be used to identify the aforementioned rotational and order harmonics as well as the rotational position of the respective gears during data acquisition. As a result, the controller may identify the position or location of a nick, gear mesh imperfection, or other asperity through analysis of the measured data.

At step 78 the controller determines, such as by reference to a counter (not shown), whether the current pass through the method is the first cycle for the present gear set. If it is the first cycle, the controller proceeds with the gear reject subroutine 80 to determine whether the vibration energy associated with nicks ($A_1$, $A_2$) or gear mesh ($A_m$) are of a magnitude that warrants rejection of the first gear, the second gear, or the gear set. During the gear reject subroutine 80 the maximum acceleration amplitudes identified as gear nick or mesh vibrations are compared to corresponding upper and lower thresholds (Steps 82, 84, 86) that may, for example, be stored in a controller data structure 70. If the acceleration amplitude exceeds the upper threshold the gear is rejected. In the illustrated embodiment, separate upper thresholds are stored for first gear nicks (Th1), second gear nicks (Th2), and mesh vibrations (Thm). The thresholds are predetermined based upon the magnitude of the nick or vibration that can be effectively lapped by the machine 12 without adversely affecting the final structure or performance of the gear set. Separate comparison steps for first gear nicks (Step 82), second gear nicks (Step 84), and mesh vibrations (Step 86) are shown in FIG. 4. If one or more of the peak acceleration amplitudes exceed the corresponding threshold, the controller generates an appropriate gear reject signal (Steps 83, 85, and 87, respectively). It is contemplated that upon the generation of a first or second gear reject signal, the controller will generate a stop machine command and identify the gear or gears having a nick that has caused vibration accelerations exceeding the associated threshold. The operator may then remove the defective gear for further processing, install a new similarly configured gear on the appropriate spindle, and start the process anew. Similarly, upon the generation of a gear mesh reject signal, both of the gears may be removed for inspection or further processing.

A variety of data may be included in each gear reject signal to facilitate efficient use of parts and further processing of rejected gears. For example, the system 10 may include a tachometer 90 operatively associated with one or both of the first and second spindles 36 and 46 to provide the controller with information relating to the rotational position of each spindle during generation of the output signals 22 from the vibration sensor 20. With this information, the controller may be configured to identify which gear tooth contains the nick or gear mesh defect. The controller may also be configured to identify the fore-aft position of the defect on the tooth as well as whether the defect is on the drive or coast face of the tooth. For example, with this position information, the operator can remove the gears, and go directly to the nicked teeth. Based on visual observation, it can be determined what corrective measures can be used to either remove the nick, or to remove the gear set from production. This information may be included in the gear and/or mesh reject signals and displayed to the operator or printed in a report so as to facilitate further processing of the gears.

If no reject signals are generated during the reject subroutine 80, or if the current pass is not the first cycle, the controller proceeds to the lapping control subroutine 92 to generate a lapping control command for the lapping apparatus 12. The methodology bypasses the gear reject subroutine 80 after the first cycle for operational efficiency. That is, if a gear is not rejected due to an acceleration amplitude exceeding a threshold in the first cycle, further lapping of the gear set will generally not create vibrations over the threshold. Accordingly, it is unnecessary to repeat the reject subroutine during continued lapping of a gear set. Notwithstanding this preferred by-passing of the gear reject subroutine 80 after the first cycle, those skilled in the art will appreciate that this subroutine may be performed during each cycle of the methodology. Further, it should be appreciated that the gear reject subroutine may be omitted from certain embodiments of the present invention without departing from the scope thereof as defined by the appended claims.

In the lapping control subroutine 92 the controller generates a lapping control command for the lapping machine 12. In the illustrated embodiment, this closed loop control of the lapping machine 12 controls the lapping duration, dwell location, and/or dwell duration based on the first gear nick amplitude ($A_1$), second gear nick amplitude ($A_2$), and gear mesh amplitude ($A_m$). With respect to the lapping and dwell durations, the controller communicates with a data structure 70 (FIG. 3) having lapping and dwell durations stored for a plurality of associated amplitudes. Further, as to location, the controller communicates with the tachometer 90 to receive and store the rotational position of the gears and monitors pinion cone motion of the gear set in relation to the received vibration signals to determine the location of the defects generating the vibrations. The controller may control the machine 12 to dwell the lapping of the gears at appropriate locations and for an appropriate dwell time. In the preferred embodiment, the controller data structure 70 includes dwell durations ($D_0, D_1, D_2, \ldots D_n$) associated with measured vibration amplitudes ($A_0, A_1, A_2, \ldots A_n$). Similarly, the controller periodically determines a lapping duration ($L_0, L_1, L_2, \ldots L_n$) based on the maximum vibration amplitudes associated with gear nick or gear mesh. The controller continues to lap the gears until the measured vibrations are at or below a lower threshold. If the determined lapping duration exceeds a predetermined maximum duration, the controller may reject the gear set as requiring excess lapping. Thus, the system 10 identifies gear nicks or other defects that can not be effectively lapped but rather should be processed through secondary operations such as hand grinding.

The methodology of the present invention may be supplemented or modified in a variety of ways generally known in the art. For example, pre-rolling of the gears may be incorporated as an initial operation of the lapping system 10. During pre-roll, the gears are brought into meshing engagement with little or no backlash. The drive gear is then rotated at a relatively low speed (e.g., on the order of 100 rpm) with a low resistance torque (e.g., 5 in/lbs.) being applied to the driven spindle. The controller evaluates the run out and accumulated pitch and index variations in a conventional manner such by processing the displacement seen in the pinion and gear cone motion (i.e. glass scale).

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

The invention claimed is:

1. In a computing environment having a main computer system and an auxiliary device coupled thereto, a system comprising:
   an auxiliary platform on the main computer system, the auxiliary platform including,
   a) an application interface that receives calls from a program running on the main computer system, including a call having a set of at least one parameter corresponding to information to communicate to the auxiliary device, the set of at least one parameter independent of any particular auxiliary device hardware; and
   a device driver interface that couples the auxiliary platform to a device driver associated with the auxiliary device; and
   wherein the auxiliary platform converts the information into a format understood by the device driver such that the device driver forwards the information for communication to the auxiliary device.

2. The system of claim 1 wherein the auxiliary device includes firmware capable of processing the information when received in a proprietary format.

3. The system of claim 1 wherein the auxiliary platform converts the information into a markup language-based format understood by the device driver or firmware on the device.

4. The system of claim 1 wherein the device driver filters at least some of the information based on capabilities of its associated auxiliary device.

5. The system of claim 1 wherein the information corresponds to a notification.

6. The system of claim 1 wherein at least part of the information corresponds to an image to display on the auxiliary device.

7. The system of claim 1 wherein at least part of the information corresponds to text to display on the auxiliary device.

8. The system of claim 1 wherein a second auxiliary device is connected to the computer system, and wherein the auxiliary platform maintains a data structure that contains data as to which auxiliary device or devices the information is to be routed for the programming on the main computer system.

9. The system of claim 8 wherein the data indicates that the information is to be routed to the second auxiliary device, wherein the second auxiliary device includes a corresponding device driver for the second auxiliary device, and wherein the auxiliary platform routes the information to the device driver for the second auxiliary device.

10. The system of claim 1 wherein the auxiliary device is coupled to the device driver via a wireless connection to the main computer system.

11. The system of claim 1 wherein the auxiliary device is coupled to the device driver via a wired connection to the main computer system.

12. The system of claim 1 wherein the device driver sends return information to the auxiliary platform in response to the information forwarded for communication to the auxiliary device.

13. The system of claim 12 wherein the return information corresponds to user interaction with the auxiliary device.

14. In a computing environment having a main computer system and an auxiliary device coupled thereto, a method comprising:
   receiving calls from a computer program running on the main computer system, including a call having a set of at least one associated parameter that corresponds to information to communicate to the auxiliary device, the set of at least one parameter independent of any particular auxiliary device hardware;
   accessing the information to convert the information to a format understood by the auxiliary device; and
   communicating data corresponding to the information to the auxiliary device.

15. The method of claim 14 further comprising, displaying the information on the auxiliary device.

16. The method of claim 14 wherein the calls are received at an auxiliary platform, and further comprising, making the call to the auxiliary platform.

17. The method of claim 14 wherein accessing the information to convert the information to a format understood by the auxiliary device comprises converting the information into a proprietary format.

18. The method of claim 14 wherein communicating data corresponding to the information comprises sending notification data.

19. The method of claim 14 wherein communicating data corresponding to the information to the auxiliary device comprises providing the information to a device driver associated with the auxiliary device.

20. The method of claim 19 further comprising, filtering, at the device driver, at least some of the information based on capabilities of its associated auxiliary device.

* * * * *